US010610944B2

(12) United States Patent
Lin

(10) Patent No.: US 10,610,944 B2
(45) Date of Patent: Apr. 7, 2020

(54) METHOD FOR CLOSING A PLURALITY OF HOLES IN A METAL ARTICLE

(71) Applicant: GENERAL ELECTRIC COMPANY, Schenectady, NY (US)

(72) Inventor: Dechao Lin, Greer, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 356 days.

(21) Appl. No.: 15/652,953

(22) Filed: Jul. 18, 2017

(65) Prior Publication Data
US 2019/0022785 A1 Jan. 24, 2019

(51) Int. Cl.
  *B23K 9/04* (2006.01)
  *B23P 6/00* (2006.01)
  *B23K 101/00* (2006.01)
  *B23K 103/04* (2006.01)
  *B23K 103/08* (2006.01)

(52) U.S. Cl.
  CPC .............. *B23K 9/042* (2013.01); *B23P 6/002* (2013.01); *B23P 6/005* (2013.01); *B23K 2101/001* (2018.08); *B23K 2103/04* (2018.08); *B23K 2103/05* (2018.08); *B23K 2103/08* (2018.08)

(58) Field of Classification Search
  CPC ........ B23K 9/042; B23K 6/002; B23K 6/005; B23K 2103/08; B23K 2103/04
  USPC ................ 219/73.21, 75, 122, 124.03, 130.5
  See application file for complete search history.

(56) References Cited

U.S. PATENT DOCUMENTS

| 7,533,795 | B2 | 5/2009 | Schaeffer et al. | |
| 9,114,481 | B1* | 8/2015 | Bruck | B23K 20/12 |
| 2011/0168679 | A1* | 7/2011 | Qi | B23K 26/36 |
| | | | | 219/75 |
| 2014/0353289 | A1* | 12/2014 | Luketic | B23K 9/0026 |
| | | | | 219/75 |
| 2015/0034266 | A1* | 2/2015 | Bruck | B22D 19/10 |
| | | | | 164/69.1 |

* cited by examiner

*Primary Examiner* — Thien S Tran
(74) *Attorney, Agent, or Firm* — McNees Wallace & Nurick LLC

(57) ABSTRACT

A method for closing a plurality of holes penetrating from a first surface of a metal article through a second surface of the metal article is disclosed including applying the metal composition to the first surface along a bridging application path. The bridging application path passes over the plurality of holes between a first edge of each of the plurality of holes and a second edge of each of the plurality of holes. Applying the metal composition along the bridging application path closes the plurality of holes.

20 Claims, 3 Drawing Sheets

METHOD FOR CLOSING A PLURALITY OF HOLES IN A METAL ARTICLE

FIELD OF THE INVENTION

The present invention is directed to methods for closing a plurality of holes in metal articles. More particularly, the present invention is directed to methods for closing a plurality of holes in metal articles by applying a metal composition along a path passing over the plurality of holes.

BACKGROUND OF THE INVENTION

Precision articles of manufacture, such as gas turbine buckets may be manufactured or repaired with processes which require the formation of a plurality of holes in between an outer surface of the bucket and an internal channel or cavity. Finishing the manufacture or repair of such articles may require closing the plurality of holes. However, depending on the material from which the article is formed, the conformations of the plurality of holes, and the quantity of the plurality of holes, closing the plurality of holes may be difficult, costly, or time intensive. Standard welding techniques may undesirably deposit material into the internal channel or cavity beneath the plurality of holes and take an undesirable amount of time to close all of the plurality of holes. Other options for closing the plurality of holes, such as inserting pre-sintered preform plugs, may be economically inefficient due to the high cost of the pre-sintered preform material, the precise machining of the plugs necessary for proper joining, and the time and effort required to close the plurality of holes.

BRIEF DESCRIPTION OF THE INVENTION

In an exemplary embodiment, a method for closing a plurality of holes penetrating from a first surface of a metal article through a second surface of the metal article includes applying the metal composition to the first surface along a bridging application path. The bridging application path passes over the plurality of holes between a first edge of each of the plurality of holes and a second edge of each of the plurality of holes. Applying the metal composition along the bridging application path closes the plurality of holes.

Other features and advantages of the present invention will be apparent from the following more detailed description of the preferred embodiment, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Figure 1:
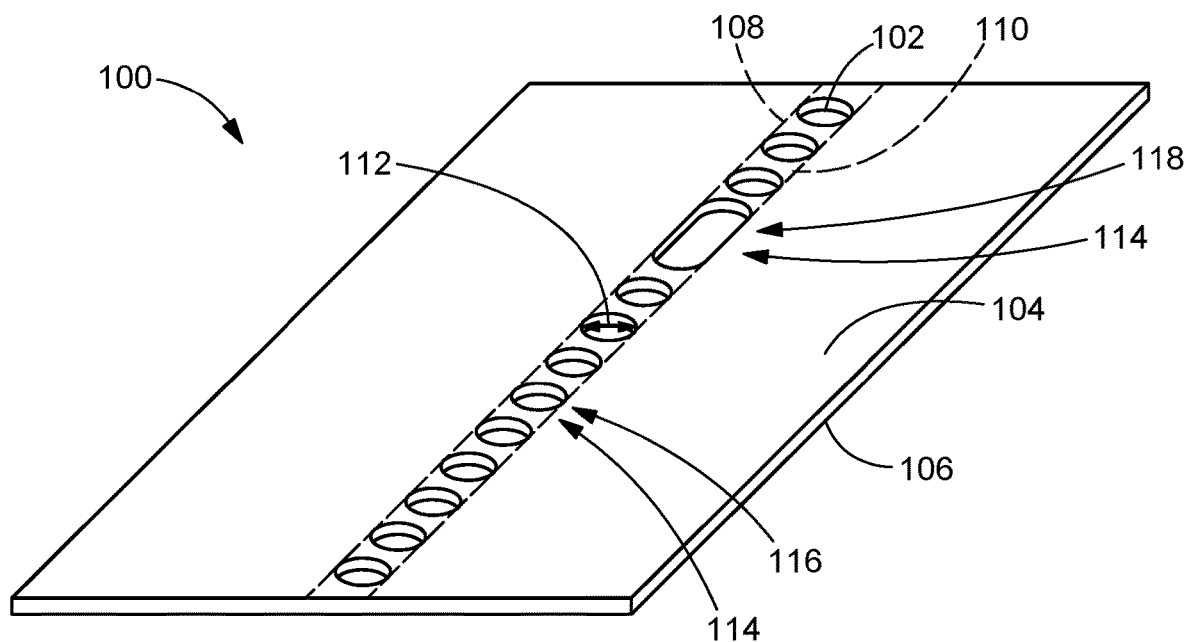
FIG. 1 is a perspective view of a metal article including a plurality of holes, according to an embodiment of the present disclosure.

Provided are exemplary methods for closing pluralities of holes in metal articles. Embodiments of the present disclosure, in comparison to articles and methods not utilizing one or more features disclosed herein, decrease costs, increase process control, increase process efficiency, increase process speed, or combinations thereof.

Referring to FIGS. 1-6, methods are disclosed for closing a plurality of holes 102 penetrating from a first surface 104 of a metal article 100 through a second surface 106 of the metal article 100. The metal article 100 may be any suitable article, including, but not limited to, a turbine component. Suitable turbine components include, but are not limited to, hot gas path components, buckets (also known as blades), nozzles (also known as vanes), shrouds, combustors, combustion liners, combustion caps, combustion diffusers, transition pieces, and combinations thereof.

The metal article 100 may include any suitable material composition, including, but not limited to, stainless steels, carbon steels, low alloy steels, superalloys, nickel-based superalloys, GTD 111, GTD 141, GTD 444, GTD 741, René 108, or combinations thereof.

As used herein, "GTD 111" refers to an alloy including a composition, by weight, of about 14% chromium, about 9.5% cobalt, about 3.8% tungsten, about 4.9% titanium, about 3% aluminum, about 0.1% iron, about 2.8% tantalum, about 1.6% molybdenum, about 0.1% carbon, and a balance of nickel. GTD 111 is available from General Electric Company, 1 River Road, Schenectady, N.Y. 12345.

As used herein, "GTD 141" refers to an alloy including a composition, by weight, of about 13.8% chromium, about 9.4% cobalt, about 3.8% tungsten, about 4.8% titanium, about 2.8% aluminum, about 1.4% niobium, about 1.5% molybdenum, and a balance of nickel. GTD 141 is available from General Electric Company, 1 River Road, Schenectady, N.Y. 12345.

As used herein, "GTD 444" refers to an alloy including a composition, by weight, of about 7.5% cobalt, about 0.2% iron, about 9.75% chromium, about 4.2% aluminum, about 3.5% titanium, about 4.8% tantalum, about 6% tungsten, about 1.5% molybdenum, about 0.5% niobium, about 0.2% silicon, about 0.15% hafnium, and a balance of nickel. GTD 444 is available from General Electric Company, 1 River Road, Schenectady, N.Y. 12345.

As used herein, "GTD 741" refers to an alloy including a composition, by weight, of about 8.3% cobalt, about 0.2% iron, about 16% chromium, about 3.3% aluminum, about 3.4% titanium, about 2.6% tungsten, about 1.7% molybdenum, about 1.7% niobium, about 0.1% carbon, about 0.1% manganese, about 0.1% vanadium, and a balance of nickel. GTD 741 is available from General Electric Company, 1 River Road, Schenectady, N.Y. 12345.

As used herein, "René 108" refers to an alloy including a composition, by weight, of about 8.4% chromium, about 9.5% cobalt, about 5.5% aluminum, about 0.7% titanium, about 9.5% tungsten, about 0.5% molybdenum, about 3% tantalum, about 1.5% hafnium, and a balance of nickel. René 108 is commercially available under that designation.

Closing the plurality of holes 102 may be free of inserting pre-sintered preform plugs into the plurality of holes 102, free of inserting metal plugs into the plurality of holes 102, free of brazing, or combinations thereof.

Closing the plurality of holes 102 may be essentially free of forming cracks. As used herein, "essentially" free of forming cracks indicates that any cracks forming during the closing of the plurality of holes 102 are less than about 0.2 inches in largest dimension, alternatively less than about 0.1 inches in largest dimension, alternatively less than about 0.05 inches in largest dimension.

Closing the plurality of holes 102 may be essentially free of weld cratering. As used herein, "essentially" free of weld cratering indicates that any cratering over a closed hole 102 is less than about 0.3 inches, alternatively less than about 0.2 inches, alternatively less than about 0.1 inches, alternatively less than about 0.05 inches, alternatively less than about 0.01 inches.

Figure 2:
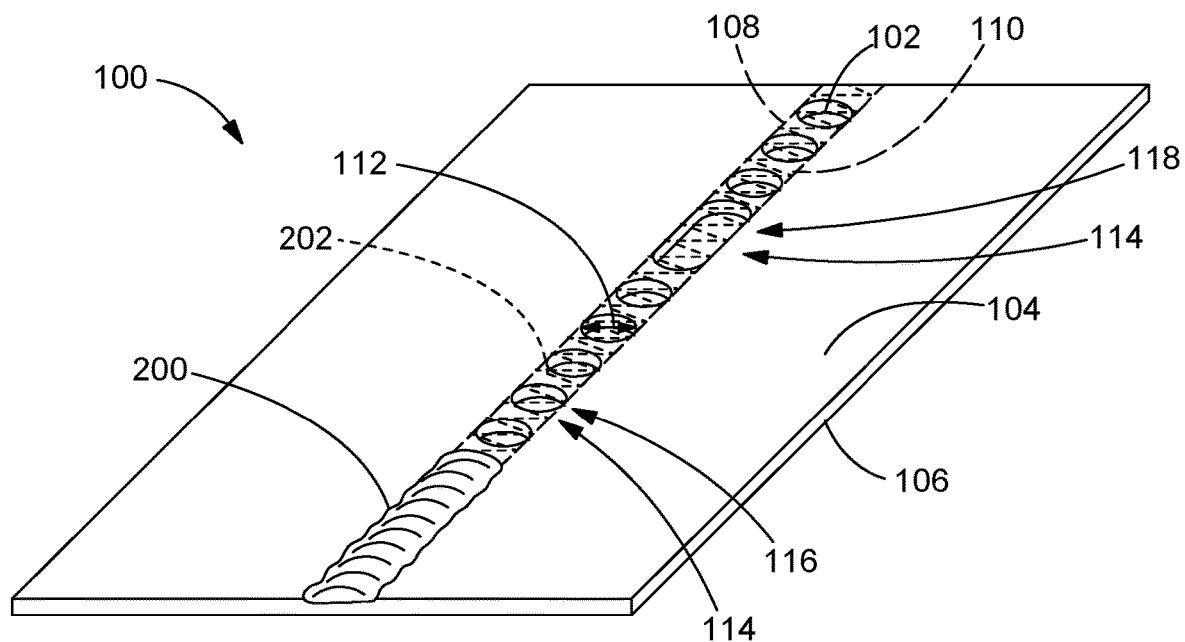
FIG. 2 is a perspective view of the metal article of FIG. 1 during application of a metal composition along a bridging application path, according to an embodiment of the present disclosure.

Referring to FIGS. 1 and 2, in one embodiment, the method includes applying a metal composition 200 to the first surface 104 along a bridging application path 202 passing over the plurality of holes 102 between a first edge 108 of each of the plurality of holes 102 and a second edge 110 of each of the plurality of holes 102. Applying the metal composition 200 along the bridging application path 202 closes the plurality of holes 102.

The metal composition 200 may include any suitable material composition, including, but not limited to, stainless steels, carbon steels, low alloy steels, superalloys, nickel-based superalloys, GTD 111, GTD 141, GTD 444, GTD 741, René 108, or combinations thereof. The metal composition 200 may include or consist of the same material composition as the metal article 100 or be distinct from the material composition of the metal article 100.

The plurality of holes 102 may include any suitable hole conformations 114 or combinations of hole conformations 114, including, but not limited to, holes 102 which are circular 116, elliptical, racetrack 118, triangular, square, or rectangular. In one embodiment, the plurality of holes 102 includes at least one racetrack 118 hole 102.

In one embodiment (shown), the bridging application path 202 oscillates between the first edge 108 and the second edge 110. As used herein, oscillating indicates a path which repeatedly changes direction, and is inclusive of waveforms, sinusoidal waveforms, square waveforms, triangular waveforms, sawtooth waveforms, irregular waveforms, and combinations thereof. In another embodiment (not shown), the bridging application path 202 proceeds along a straight, curved, or combination thereof, non-oscillating pathway aligned with the first edge 108 and the second edge 110. In yet another embodiment (not shown), the bridging application path 202 oscillates between the first edge 108 and the second edge 110 in portions wherein the plurality of holes 102 include an aperture size 112 for which oscillation is beneficial to close the plurality of holes 102, and proceeds along a non-oscillating pathway in portions wherein the plurality of holes 102 include an aperture size 112 for which oscillation does not provide a benefit to close the plurality of holes 102.

Applying the metal composition 200 along the bridging application path 202 may include a single pass along the bridging application path 202 or a plurality of sequential passes along the bridging application path 202.

Applying the metal composition 200 may include any suitable application technique, including, but not limited to, an additive welding technique. Suitable additive welding techniques include, but are not limited to, consumable electrode welding, scanning consumable electrode welding, gas metal arc welding, scanning gas metal arc welding, flux core arc welding, scanning flux core arc welding, metal core arc welding, scanning metal core arc welding, or combinations thereof.

The additive welding technique may operate at any suitable welding speed, including, but not limited to, a welding speed of between about 30 ipm to about 90 ipm, alternatively between about 40 ipm to about 80 ipm, alternatively between about 30 ipm to about 50 ipm, alternatively between about 40 ipm to about 60 ipm, alternatively between about 50 ipm to about 70 ipm, alternatively between about 60 ipm to about 80 ipm, alternatively between about 70 ipm to about 90 ipm.

In one embodiment, closing the plurality of holes 102 includes closing at least about 10 holes 102 within about 6 minutes, alternatively at least about 25 holes 102, alternatively at least about 50 holes 102, alternatively at least about 75 holes 102, alternatively at least about 100 holes 102, alternatively at least about 250 holes 102, alternatively at least about 500 holes 102, alternatively at least about 750 holes 102, alternatively at least about 1,000 holes 102, alternatively at least about 1,500 holes 102, alternatively at least about 2,000 holes 102, alternatively at least about 5,000 holes 102.

In one embodiment, applying the metal composition 200 includes overfilling the plurality of holes 102 with the metal composition 200, and subsequently removing excess metal composition 200 to form a substantially flush surface. As used herein, "substantially" flush indicates that any surface deviation from the metal composition 200 is less than about 0.05 inches, alternatively less than about 0.02 inches, alternatively less than about 0.01 inches, alternatively less than about 0.005 inches, alternatively less than about 0.002 inches, alternatively less than about 0.001 inches.

Removing excess metal composition 200 may include any suitable finishing technique, including, but not limited to, machining, polishing, abrasive blasting, burnishing, peening, electropolishing, grinding, etching, buffing, and combinations thereof.

Figure 3:
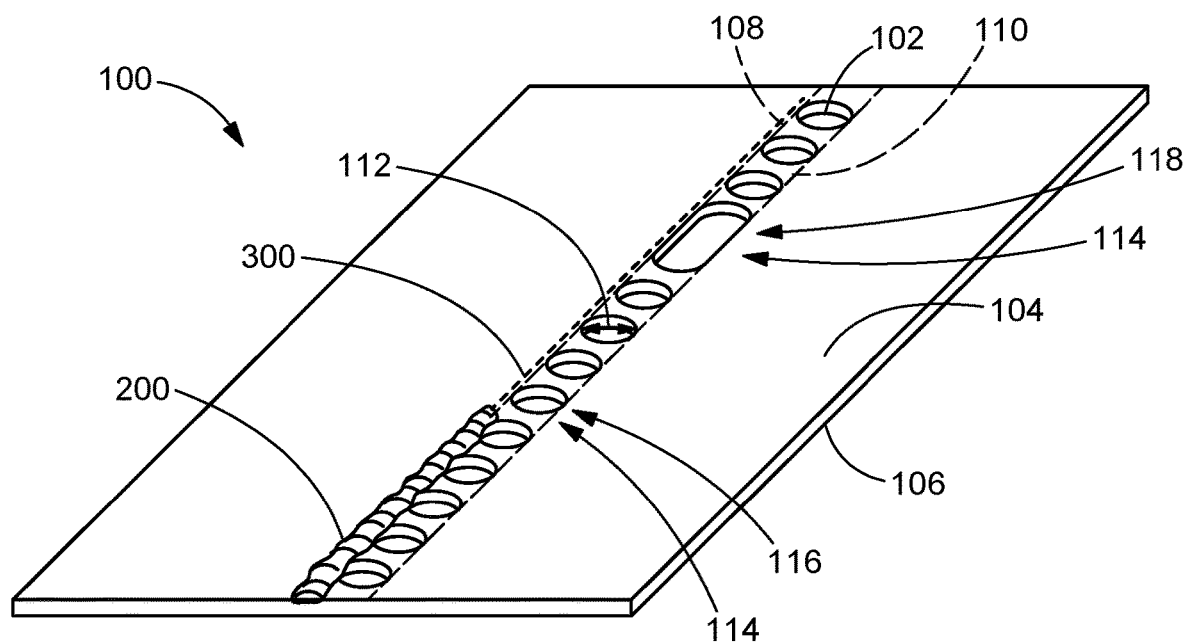
FIG. 3 is a perspective view of the metal article of FIG. 1 during application of a metal composition along a first application path, according to an embodiment of the present disclosure.
Figure 4:
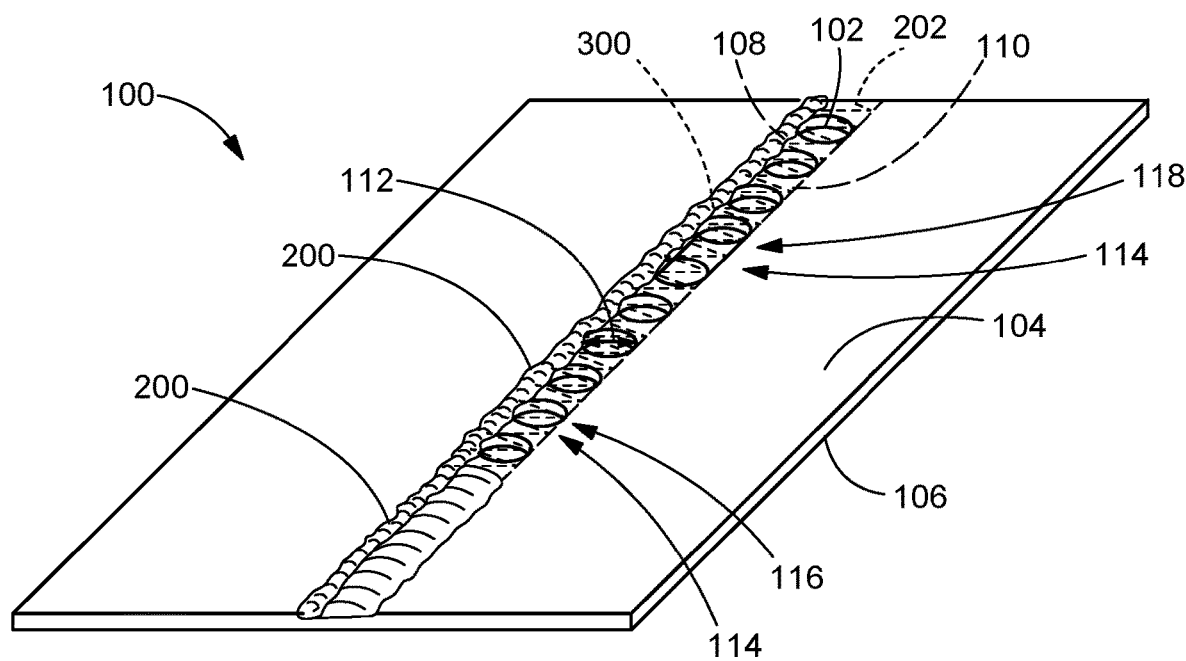
FIG. 4 is a perspective view of the metal article of FIG. 3 during application of a metal composition along a bridging application path, according to an embodiment of the present disclosure.
Figure 5:
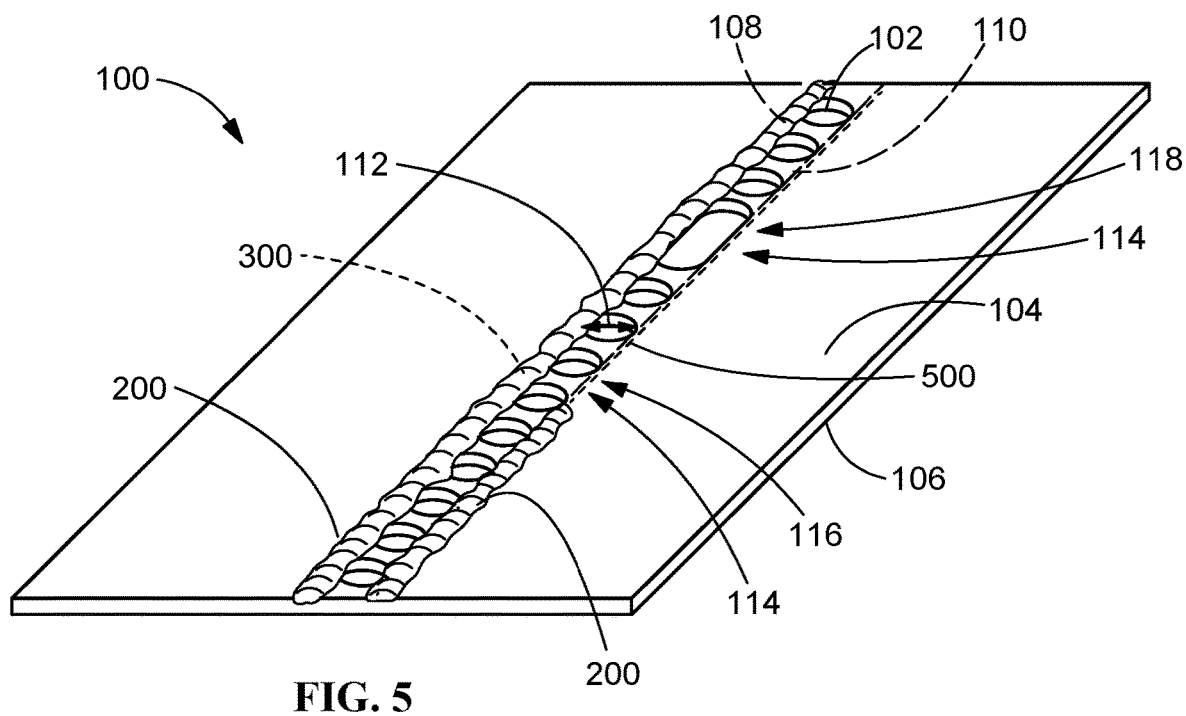
FIG. 5 is a perspective view of the metal article of FIG. 3 during application of a metal composition along a second application path, according to an embodiment of the present disclosure.
Figure 6:
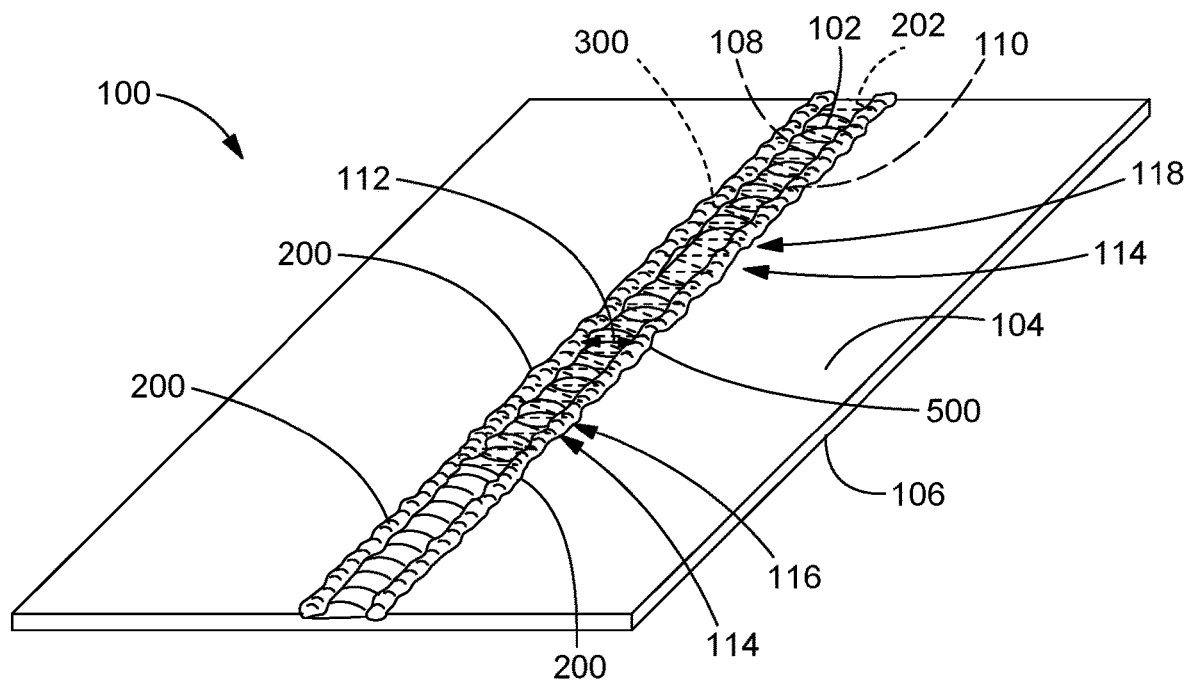
FIG. 6 is a perspective view of the metal article of FIG. 5 during application of a metal composition along a bridging application path, according to an embodiment of the present disclosure.

Referring to FIGS. 1, 3, and 4, in one embodiment, prior to applying the metal composition 200 to the first surface 104 along the bridging application path 202, the metal composition 200 is applied to the first surface 104 along a first application path 300. The first application path 300 follows the first edge 108 of each of the plurality of holes 102. Applying the metal composition 200 along the first application path 300 decreases the aperture size 112 of the plurality of holes 102. Applying the metal composition 200 to the first surface 104 along the bridging application path 202 proceeds between the first application path 300 and the second edge 110. Applying the metal composition 200 along the first application path 300 may include a single pass along the first application path 300 or a plurality of sequential passes along the first application path 300.

In one embodiment (shown), the bridging application path 202 oscillates between the first application path 300 and the second edge 110. In another embodiment (not shown), the bridging application path 202 proceeds along a straight, curved, or combination thereof, non-oscillating pathway aligned with the first application path 300 and the second edge 110. In yet another embodiment (not shown), the bridging application path 202 oscillates between the first application path 300 and the second edge 110 in portions wherein the plurality of holes 102 include an aperture size 112 for which oscillation is beneficial to close the plurality of holes 102, and proceeds along a non-oscillating pathway in portions wherein the plurality of holes 102 include an aperture size 112 for which oscillation does not provide a benefit to close the plurality of holes 102.

Referring to FIGS. 1, 3, 5, and 6, in one embodiment, prior to applying the metal composition 200 to the first surface 104 along the bridging application path 202, the metal composition 200 is applied to the first surface 104 along the first application path 300 and a second application path 500. The second application path 500 follows the second edge 110 of each of the plurality of holes 102. Applying the metal composition 200 along the second application path 500 decreases the aperture size 112 of the plurality of holes 102. Applying the metal composition 200 to the first surface 104 along the bridging application path 202 proceeds between the first application path 300 and the second application path 500. Applying the metal composition 200 along the second application path 500 may include a single pass along the second application path 500 or a plurality of sequential passes along the second application path 500.

In one embodiment (shown), the bridging application path 202 oscillates between the first application path 300 and the second application path 500. In another embodiment (not shown), the bridging application path 202 proceeds along a straight, curved, or combination thereof, non-oscillating pathway aligned with the first application path 300 and the second application path 500. In yet another embodiment (not shown), the bridging application path 202 oscillates between the first application path 300 and the second application path 500 in portions wherein the plurality of holes 102 include an aperture size 112 for which oscillation is beneficial to close the plurality of holes 102, and proceeds along a non-oscillating pathway in portions wherein the plurality of holes 102 include an aperture size 112 for which oscillation does not provide a benefit to close the plurality of holes 102.

Applying the metal composition 200 to the first surface 104 along the second application path 500 may follow applying the metal composition 200 to the first surface 104 along the first application path 300 or occur while applying the metal composition 200 to the first surface 104 along the first application path 300.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for closing a plurality of holes penetrating from a first surface of a metal article through a second surface of the metal article, comprising:
applying a metal composition to the first surface along a bridging application path passing over the plurality of holes between a first edge of each of the plurality of holes and a second edge of each of the plurality of holes, applying the metal composition along the bridging application path closing the plurality of holes,
wherein the plurality of holes are open from the first surface through the second surface and into an unfilled volume disposed below the second surface while applying the metal composition.

2. The method of claim 1, wherein applying the metal composition along the bridging application path includes the bridging application path oscillating between the first edge and the second edge.

3. The method of claim 1, further including, prior to applying the metal composition to the first surface along the bridging application path, applying the metal composition to the first surface along a first application path, wherein:
the first application path follows the first edge of each of the plurality of holes;
applying the metal composition along the first application path decreases an aperture size of the plurality of holes; and
applying the metal composition to the first surface along the bridging application path proceeds between the first application path and the second edge.

4. The method of claim 3, further including, prior to applying the metal composition to the first surface along the bridging application path, applying the metal composition to the first surface along a second application path, wherein:
the second application path follows the second edge of each of the plurality of holes;
applying the metal composition along the second application path decreases an aperture size of the plurality of holes; and
applying the metal composition to the first surface along the bridging application path proceeds between the first application path and the second application path.

5. The method of claim 4, wherein applying the metal composition along the bridging application path includes the bridging application path oscillating between the first application path and the second application path.

6. The method of claim 4, wherein applying the metal composition to the first surface along the second application path occurs while applying the metal composition to the first surface along the first application path.

7. The method of claim 1, wherein applying the metal composition includes an additive welding technique.

8. The method of claim 7, wherein the additive welding technique is selected from the group consisting of consumable electrode welding, scanning consumable electrode welding, gas metal arc welding, scanning gas metal arc welding, flux core arc welding, scanning flux core arc welding, metal core arc welding, scanning metal core arc welding, and combinations thereof.

9. The method of claim 7, wherein the additive welding technique operates at between about 30 ipm and about 90 ipm.

10. The method of claim 1, wherein closing the plurality of holes includes closing at least 10 holes in less than about 6 minutes.

11. The method of claim 1, wherein applying the metal composition includes a plurality of sequential passes.

12. The method of claim 1, wherein the plurality of holes includes at least one racetrack hole.

13. The method of claim 1, wherein closing the plurality of holes is free of inserting pre-sintered preform plugs into the plurality of holes.

14. The method of claim 1, wherein closing the plurality of holes is free of inserting metal plugs into the plurality of holes.

15. The method of claim 1, wherein closing the plurality of holes is free of brazing.

16. The method of claim 1, wherein closing the plurality of holes is essentially free of forming cracks.

17. The method of claim 1, wherein closing the plurality of holes is essentially free of weld cratering.

18. The method of claim 1, wherein the metal article is a turbine component.

19. The method of claim 1, wherein the metal article and the metal composition independently include a material composition selected from the group consisting of stainless steels, carbon steels, low alloy steels, superalloys, nickel-based superalloys, GTD 111, GTD 141, GTD 444, GTD 741, Rene 108, and combinations thereof.

20. A method for closing a plurality of holes penetrating from a first surface of a metal article through a second surface of the metal article, comprising:
    applying a metal composition to the first surface along a first application path, the first application path following a first edge of each of the plurality of holes, and applying the metal composition along the first application path decreasing an aperture size of the plurality of holes;
    applying the metal composition to the first surface along a second application path, the second application path following a second edge of each of the plurality of holes, and applying the metal composition along the second application path decreasing the aperture size of the plurality of holes; and
    following applying the metal composition along the first application path and the second application path, applying the metal composition to the first surface along a bridging application path passing over the plurality of holes between the first application path and the second application path, applying the metal composition along the bridging application path closing the plurality of holes.

* * * * *